(12) United States Patent
Corn (10) Patent No.: US 9,004,259 B1
(45) Date of Patent: Apr. 14, 2015

(54) REPOSITIONABLE EXTENDABLE STOP

(71) Applicant: Intelligrated Headquarters LLC, Mason, OH (US)

(72) Inventor: Bryan Dale Corn, Highland, IL (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 14/026,463

(22) Filed: Sep. 13, 2013

Related U.S. Application Data (60) Provisional application No. 61/701,061, filed on Sep. 14, 2012.

(51) Int. Cl.
    B65G 47/29    (2006.01)
    B65G 13/00    (2006.01)
    B65G 13/075   (2006.01)
    B65G 47/88    (2006.01)

(52) U.S. Cl.
    CPC ............ B65G 47/29 (2013.01); B65G 13/00 (2013.01); B65G 13/075 (2013.01); B65G 2205/00 (2013.01); B65G 47/8815 (2013.01)

(58) Field of Classification Search
    CPC ........ B65G 13/11; B65G 13/12; B65G 47/29; B65G 47/8815; B65G 47/8876; B65G 47/295; B65G 2205/00

USPC ............ 198/368, 419.1, 459.6, 459.7, 463.6, 198/463.4, 530; 193/35 G
See application file for complete search history.

(56) References Cited

U.S. PATENT DOCUMENTS

| 3,700,127 | A |   | 10/1972 | Kurk et al. |
| 3,760,932 | A | * | 9/1973  | Schneider ............... 198/781.09 |
| 4,088,221 | A |   | 5/1978  | Bowser |
| 4,627,526 | A |   | 12/1986 | Masciarelli |
| 6,019,211 | A | * | 2/2000  | Masciarelli, Jr. .......... 198/345.1 |
| 6,193,047 | B1 |  | 2/2001  | Brumm et al. |
| 6,230,872 | B1 |  | 5/2001  | Huang et al. |
| 6,435,352 | B1 | * | 8/2002 | Schoenbeck et al. ......... 209/509 |
| 6,763,930 | B2 | * | 7/2004 | Johnson et al. ............ 198/459.6 |
| 7,185,752 | B2 | * | 3/2007 | Hakansson ................ 198/419.1 |
| 7,770,718 | B2 |  | 8/2010  | Fourney |

FOREIGN PATENT DOCUMENTS

| EP | 0193740 | 9/1986 |
| EP | 1457447 | 9/2004 |

* cited by examiner

Primary Examiner — Leslie A Nicholson, III
(74) Attorney, Agent, or Firm — Frost Brown Todd LLC (57) ABSTRACT

Repositionable extendable stops for material handling applications include top loading/unloading stops which engage with actuator through quick disconnects. Actuators are easily repositioned to a new stop location, and the stop reconnected to the actuator by loading the stop through the top of the conveyor.

13 Claims, 7 Drawing Sheets

REPOSITIONABLE EXTENDABLE STOP

BACKGROUND

The present invention relates generally to material handling conveyors, and is particularly directed to a device and method which simplifies the location and relocation of stops for product flow control. The invention will be specifically disclosed in connection with positionable pop up stops used in a row former of a case palletizer.

In the world of material handling, case palletizers are machines that automate and speed up the creation of a palletized load by receiving loose cases or articles from a feed conveyor, forming the articles into formed layers with the row former, and stacking the formed layers onto a pallet with a layer-by-layer stacking process. Articles can include cases, cartons, and bags. In high volume factories, a case palletizer can be a custom product designed to palletize one article of one specific size.

This solution has some downfalls. The custom built case palletizer is specifically designed for one article and must be reconfigured to palletize an article of a different size or shape. With some articles, a simple reprogramming of the palletizer control system is adequate. With other articles, the palletizer must be re-programmed and physical elements of the palletizer must be physically re-built or re-configured. The rebuilding or reconfiguration process can result in: lengthy reconfiguration downtimes, high labor costs, and reduced palletizer throughput.

Although the present innovation will be described herein in connection with pop up stops for use with a row former, it will be understood that present innovation is not limited in use or application thereto. The teachings of the present innovation may be used in applications using any pop up stops that are desired to be location reconfigurable.

BRIEF DESCRIPTION OF THE FIGURES

The accompanying drawings, which are incorporated in and constitute a part of this specification, illustrate embodiments, and, together with the general description given above, and the detailed description of the embodiments given below, serve to explain the principles of the present invention.

Reference will now be made in detail to the present preferred embodiment of the invention, an example of which is illustrated in the accompanying drawings.

DETAILED DESCRIPTION

The innovation disclosed and claimed herein, in one aspect thereof, comprises a pop up stop that is easily re-positioned to a new location. The pop up stops are located in a row former of a case palletizer. The row former includes a roller conveyor that receives an input of articles from a feed conveyor. One or more pop up stops can be located beneath the roller conveyor, and each pop up stop can be individually actuated to extend a barrier through a gap between the rollers. When the barrier is extended, an article traveling along the row former is stopped by the barrier. As subsequent articles are inputted into the row former, the pop up stops are activated sequentially to form a row of spaced-apart articles along the row former.

When the row of articles is fully formed, the formed row is then moved from the row former and further into the palletizer to become part of a formed layer of articles on a pallet. The pop up stops are designed to be rapidly and easily re-positioned in the conveyor to change the spacing between the articles formed in a spaced-apart row. This enables a palletizer to be easily re-configured to operate with a different sized article. To re-configure a palletizer to operate with different sized articles, the pop-up stops can be easily re-positioned. To change number of articles in a row, the number of pop-up stops can be easily increased or decreased.

The present innovation can provide features and benefits such as (i) rapid re-positioning of pop-up stops to reduce palletizer re-configuration downtimes; (ii) modularized pop-up stops minimize the need for custom components; (iii) reduced labor costs from reduced reconfiguration downtimes time; (iv) increased palletizer throughput; (v) replaces hard hydraulic lines with flexible hydraulic lines to allow movement of the pop up stops to other positions; (vi) provides wiring of sufficient length to allow movement of pop-up actuators without wiring modifications; and (vii) the modular design easily accommodates an increase or decrease in the number of pop up stops in a row to change the number of cartons in a formed row.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

Figure 1:
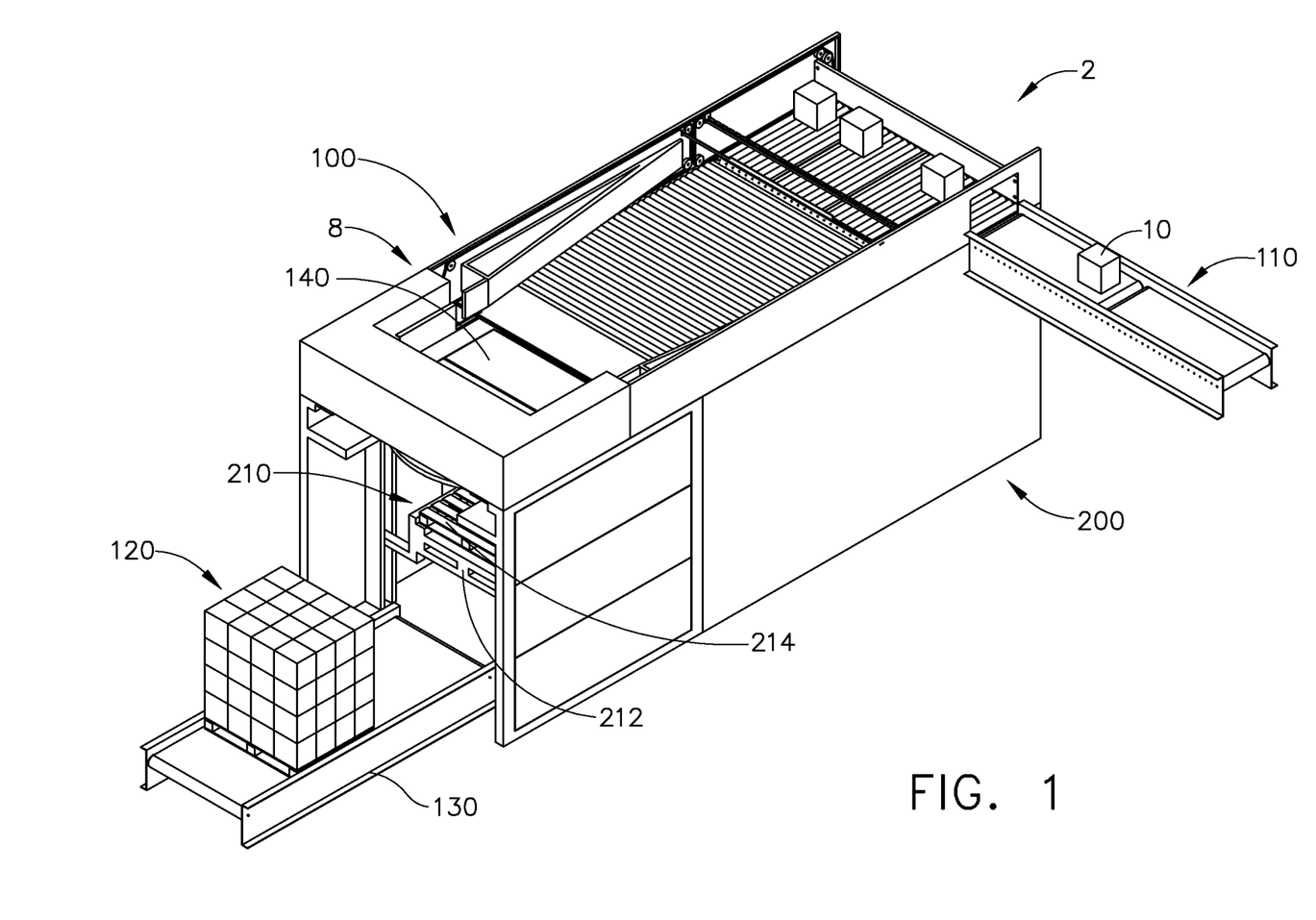
FIG. 1 is perspective view of a case palletizer.
Figure 2:
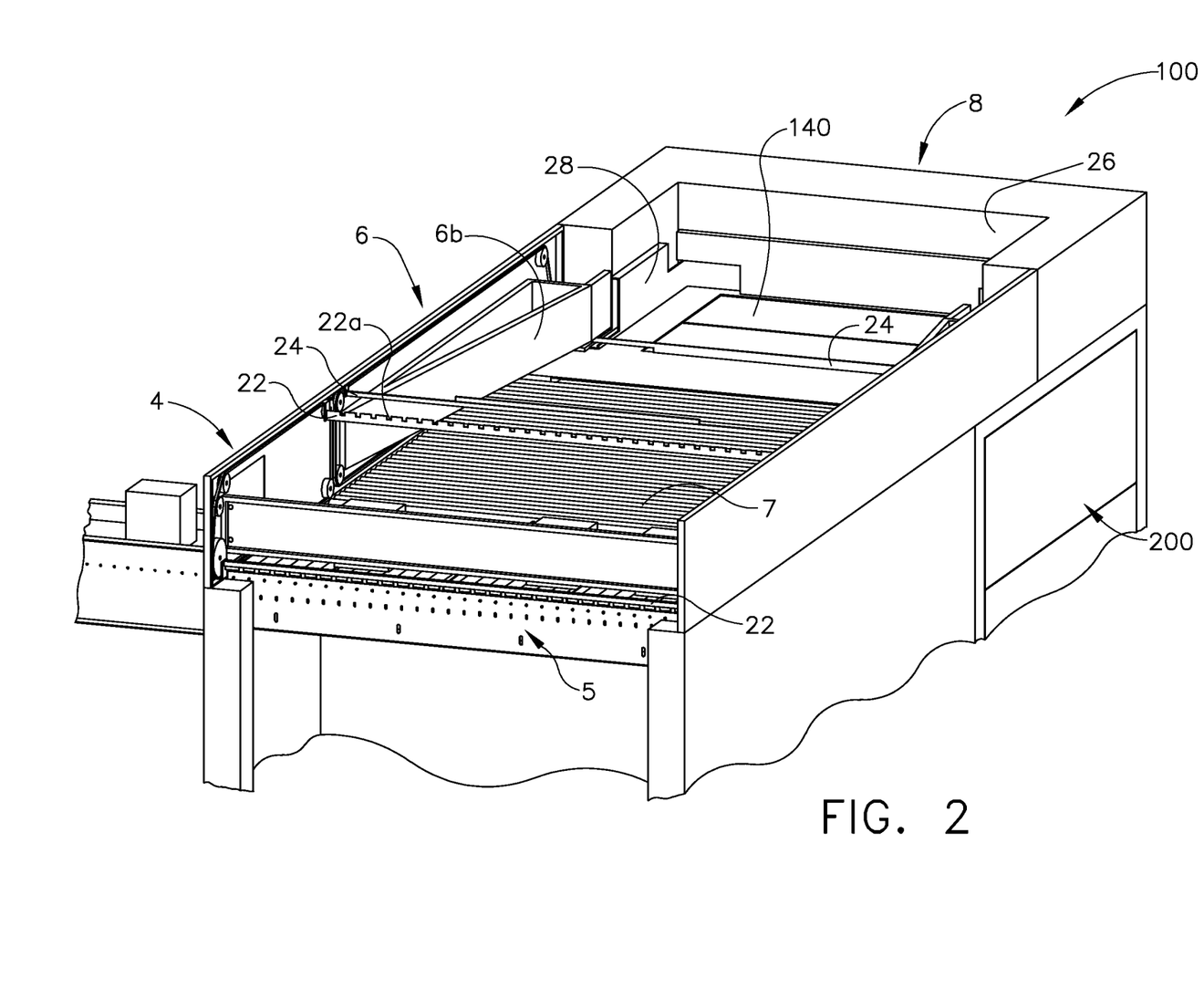
FIG. 2 is a fragmentary perspective view of the upper level of the case palletizer illustrated in FIG. 1.

Referring to FIGS. 1 and 2, there is shown case palletizer assembly, generally indicated at 2, which includes an upper level 100 that receives a steady stream of articles 10 from an input conveyor 110 and a lower level 200 that discharges a palletized load 120 of articles 10 onto an exit conveyor 130 for shipping. The upper level 100 receives, collects, organizes, and forms the loose articles 10 into a formed layer 110 on top of a pair of elevator doors 140. The lower level 200 receives the formed layer 110 when the elevator doors 140 open, and builds up the palletized load 120 layer-by-layer on a pallet 214 until the palletized load 120 is ready for shipping. The lower level 200 can include an elevator 210 with a lift 212 that moves the pallet 214 vertically to collect the formed layers 110. The lift is movable between a first position located directly below the elevator doors 140 to receive the formed layer 110 from the first level 100, and a second position level with the exit conveyor 130 to discharge the palletized load 120.

Figure 3:
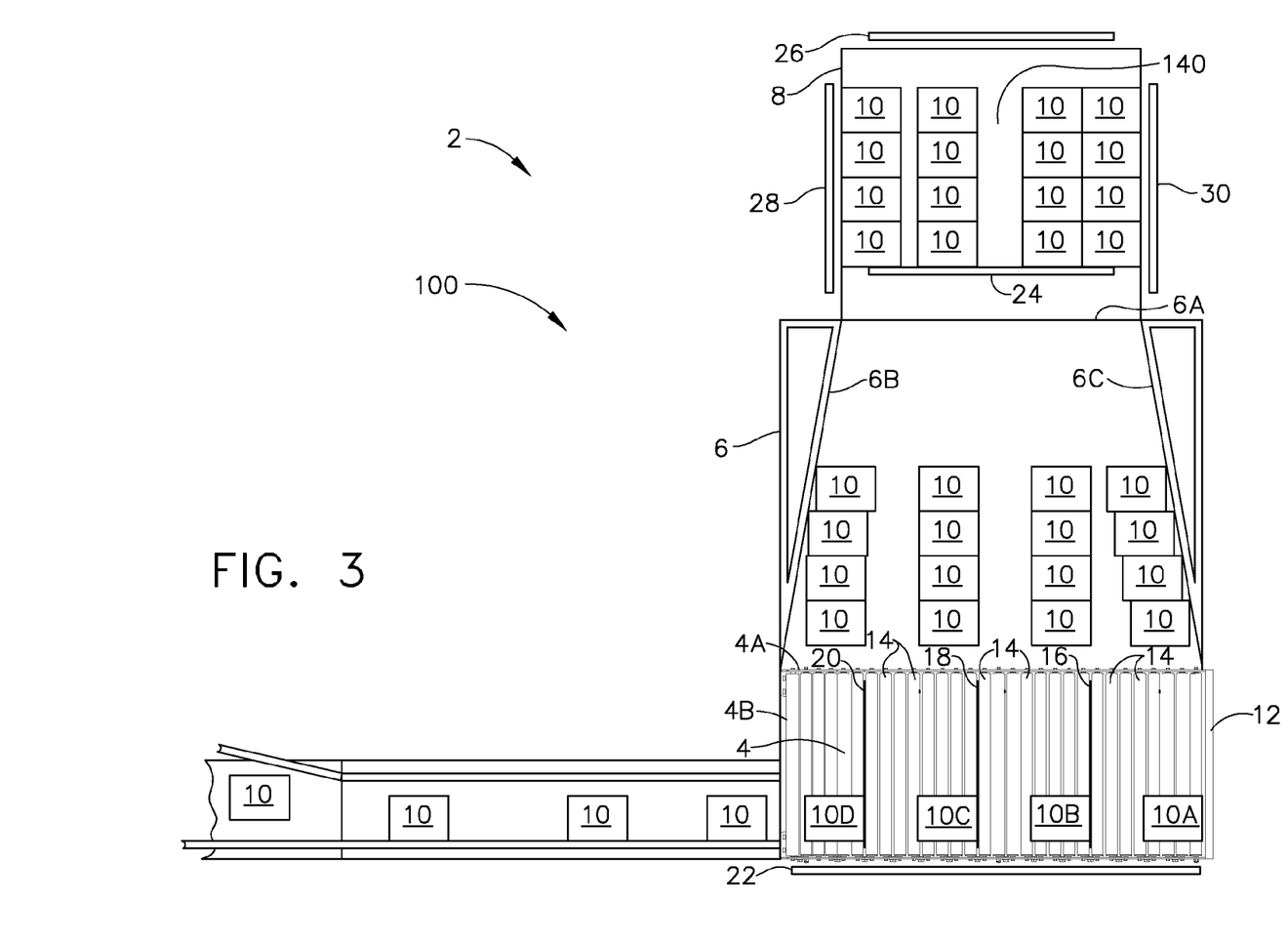
FIG. 3 is a diagrammatic plan view of the case palletizer illustrated in FIG. 1.

Referring to FIGS. 2 and 3, there is shown a top view of the upper level 100 of the case palletizer assembly 2 which includes a row former 4, a layer table 6, and an apron 8. In a manner well known in the industry, a directed onto row former 4 that includes a roller conveyor 5. When entering an empty row former 4, the lead article 10A is advanced thereon until it reaches an end barrier 12, which stops further advancement. End barrier 12 may be adjustable, so depending on the pattern being built, end barrier 12 may be disposed upstream or downstream of the illustrated location, so long as there is a roller 14 proximal to barrier 12. Once article 10A reaches barrier 12, a stop 16 may be raised so that it stops the next successive article 10B. Similarly, a stop 18 may then be raised, stopping the advancement of article 10C, followed by the raising of a stop 20, stopping the advancing article 10D. Although one article per stop is illustrated, the number of articles per stop may be any number to the article dimensions and the pattern being built. For example, for articles having different lateral and longitudinal dimensions, some may be turned before reaching row former 4.

Once a row is formed, a row pusher bar 22 advances laterally (relative to the downstream direction of row former 4) and pushes the row, 10A, 10B, I0C and 10D, onto layer table 6. Pusher bar 22 can include notches 22a that clear the raised stops 16, 18, 20 as pusher bar 22 moves laterally. Layer table 6 may have an upper surface defined by rollers 7 disposed transverse relative to rollers 14 of former 4, and may be declined away from row former 4. Once row pusher bar 22 has advanced far enough, additional articles may be directed onto row former 4.

As subsequent rows are formed on row former 4 and pushed out, as a row, onto layer table 6, an array of articles 10 arranged in rows and, in the depicted embodiment, columns. Once the entire layer of articles 10 has been formed on layer table 6, a transverse push bar 24 is advanced from adjacent edge 4A of row former 4 toward apron 8. The pusher bar advances the length of layer table 6, pushing the array completely onto elevator doors 140 on apron 8 as illustrated in FIG. 3. As articles 10 are advanced, optional layer guides 6B and 6C, disposed spaced apart from each other along the longitudinal edges of layer table 6, function to guide articles 10 at the edge of the array toward the center. The pusher bar 24 advances to adjacent edge 6A (although in some configurations, pusher bar 24 may go as far as illustrated in FIG. 3) and remains there as front dam 26, and side dams 28, 30, are advanced, moving articles 10 into a tighter array of the layer pattern. After in the proper relative positions, dams 26, 28 and 30 will retract and elevator doors 140 will open to allow the newly formed layer to drop onto the pallet 212 or a previously formed layer.

The location and number of stops is dependent on the pattern being formed. Stops 16, 18, 20 may be positioned, or repositioned, to any desired location aligned with a gap between adjacent rollers 14, based on the pattern being formed.

Figure 4:
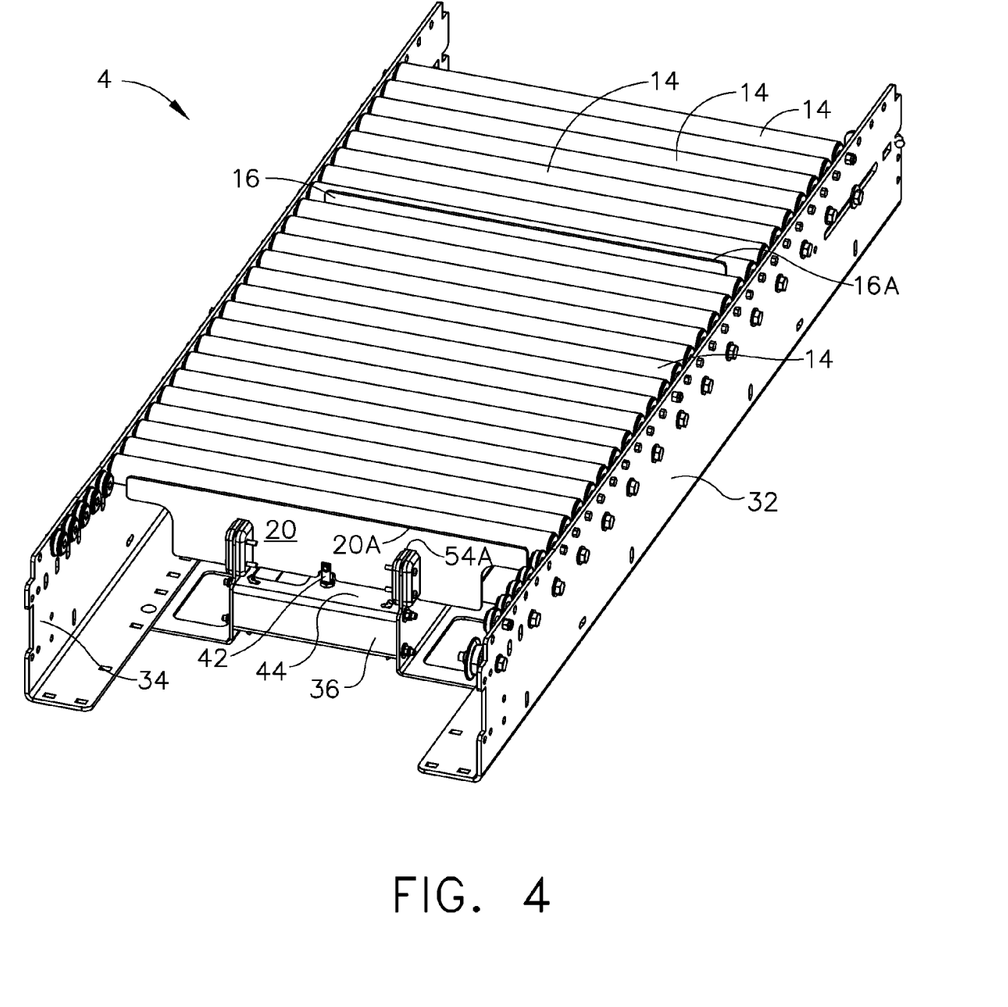
FIG. 4 is a top perspective view of a row former conveyor having stops constructed in accordance with the teachings of the present invention.
Figure 5:
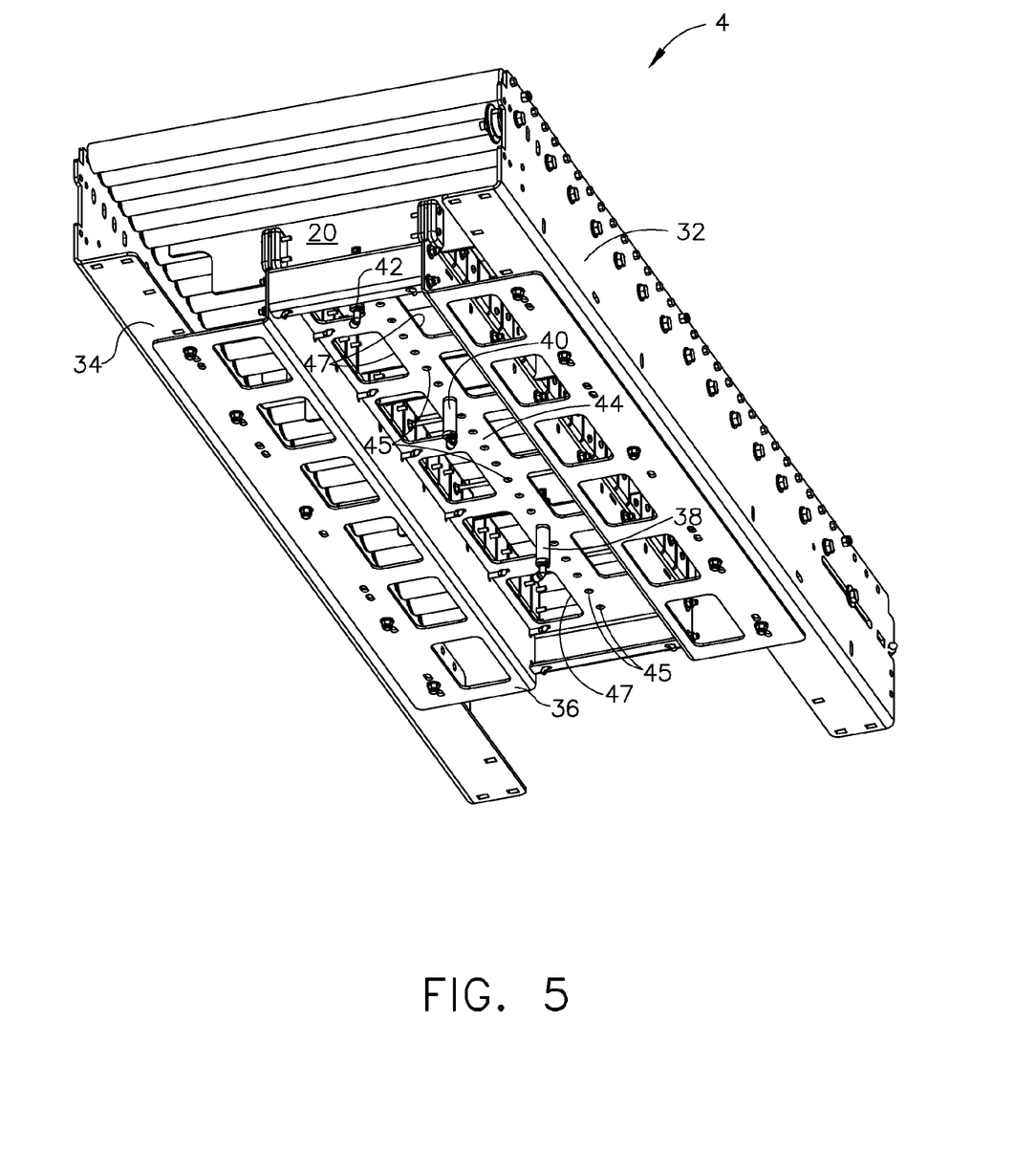
FIG. 5 is bottom perspective view of the row former conveyor of FIG. 4.

Referring to FIGS. 4 and 5, row former 4 includes a pair of spaced apart outside frame members 32, 34, which may be supported by a separate frame/support of the case palletizer 2. Frame members 32, 34 carry a plurality of rotatable rollers 14 which define the upper conveying surface of row former 4. In the embodiment depicted, at entrance end 4B, the rollers 14 have been removed from FIG. 2 in order to view stop 20. The axis of rotation of the omitted rollers 14 (not shown) may be disposed at a higher level than the axis of rotation of rollers 14, and may even decline from entrance end 4B toward rollers 14. Rollers 14 may be driven by any suitable drive, such as a motor driven belt (not shown) which engages rollers 14. Such a motor could also drive the incoming conveyor which feeds former 4.

Frame members 32, 34 also carry and support a stop subassembly 36. Stop subassembly 36 is a support for and supports and carries a plurality of stops 16, 18, 20, which may be repositioned to any desired configured location of stop subassembly 36. Referring to stop 20 for example, as can be seen in FIG. 2, stop 20 has upper edge 20A, which in a lowered position, lies just below the conveying surface defined by rollers 14. Stop 16 is shown in the operable raised position, with upper edge 16A extending above the conveying surface defined by rollers 14 a height sufficient to engage and stop articles 10, in the depicted embodiment, about ¼ inch.

Stop subassembly 36 is also a support for and carries actuators 38, 40, and 42. Stop subassembly 36 includes a plurality of actuator mounting locations, illustrated as holes 45 in the depicted embodiment, respectively aligned with gaps between rollers 14. The actuator mounting locations 45 are configured complementarily with actuators 38, 40, and 42 so as to carry and provide support therefor. In the depicted embodiment, actuators 38, 40 and 42 are disposed through respective holes 45, extending below central web 44, and are secured at the top of web 44 by suitable fasteners, such as nuts 46 (FIG. 8), which provide for quick installation and removal of actuators 38, 40 and 42. Stop subassembly 36 and actuators 38, 40 and 42 are configured to permit access to the actuator from below rollers 14 in order to install or remove actuators 38, 40 and 42 from below. The actuator mounting locations 45 are spaced apart in a line a distance generally equal to the linear distance between the rollers 14. Actuators 38, 40, and 42a are configured for rapid installation and repositioning from the underside of the row former 4. In the depicted embodiment, actuators 38, 40 and 42 are spring loaded single acting fluidic cylinders connected to a selectively operable fluidic source but are not limited thereto. Fluidic actuators 42 can be operated with any compressible or incompressible fluids such as but not limited, to air and hydraulic fluids respectively. Additionally, any suitable actuator may be used which provides the functionality of raising and lowering stops 16, 28, 20 such as any actuator that uses magnetism for operation. Magnetic actuators can include, but are not limited to, solenoids, and any actuator with an electric motor.

Figure 6:
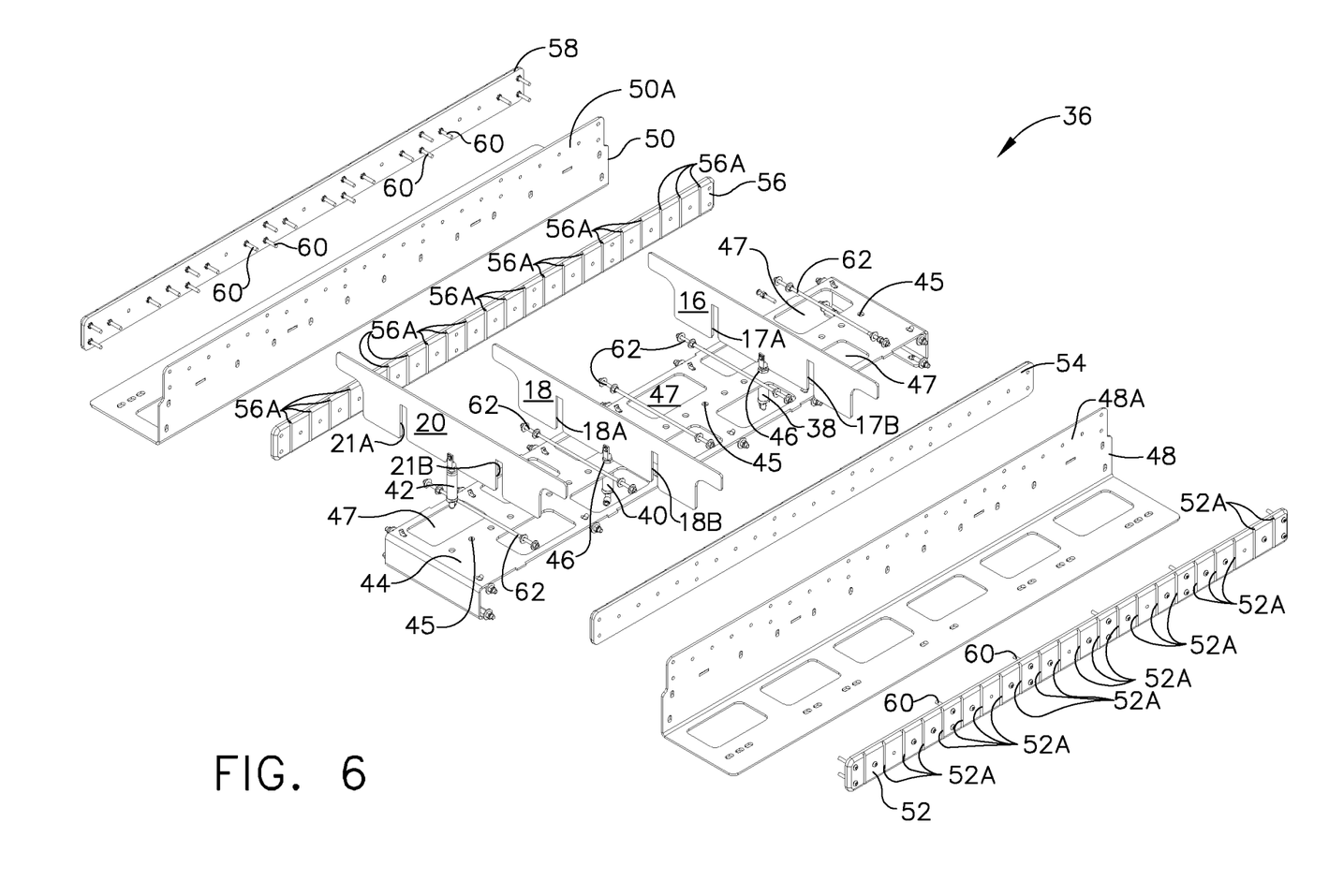
FIG. 6 is an exploded view of the row former conveyor and stops of FIG. 4

Referring also to FIG. 6, which is an exploded view of subassembly 36, it can be seen that subassembly 36 includes spaced apart frames 48, 50, each of which includes a planar upper portion 48A, 50A which are respectively interposed between respective pairs of two elongated guides 52 and 54, and 56 and 58. Guides 52 and 54, and 56 and 58 may be made of any suitable material, such as UHMW. Each guide pair 52 and 54, and 56 and 58, is secured to a respective upper portion 48A, 50A, by a plurality of fasteners 60, such as bolts, washers and nuts in a position that will align guide features with gaps between the rollers 14. A plurality of spacers 62 extend between upper portions 48A and 50A to maintain the desired spacing and provide the desired rigidity. Spacers 62 may be an all-thread rod, with nuts and washers sandwiching the guide/upper portion/guide arrangements. It is noted that the fastener hole pattern of the embodiment depicted in FIG. 4 includes a plurality of single holes with interspersed pairs of vertically aligned holes. The fastener hole pattern allows flexibility in the placement of spacers 62.

Frames 48, 50 may be secured to web 44 along the respective lower edges, and connected together such as by using J hooks, such as described in U.S. Pat. No. 5,421,451, which is incorporated herein by reference.

Each guide pair 52 and 54, and 56 and 58, includes a respective plurality of grooves 52A, 54A (not seen in FIG. 6), 56A and 58A (not seen in FIG. 6). For reasons that will become apparent later, grooves 52A, 54A, 56A, and 56A, can be spaced linearly along the guides 52, 54, 56 and 58 at a spacing equal to the linear distance between the rollers 14. When guide pairs 52 and 54, are mounted to upper portion 48A, and guide pairs 56 and 58 are mounted to upper portion 50A, the respective grooves on either side of the upper portion 48A and 50A face outwards and in parallel alignment on either side of the upper portion 48A and 50A to form pairs of spaced apart receiving grooves in parallel alignment with one of the plurality of holes 45 in central web 44.

As depicted in FIG. 6, each stop 16, 18 and 20 has respective pairs of spaced apart slots, 17A and 17B, 18A and 18B, and 21A and 21B. The spacing between slots 17A, 17b, 18A, 18B, 21A, and 21B on each stop 16, 18 and 20 corresponds to the spacing between the outward facing and parallel aligned grooves 52A, 54A, 56A, 58A mounted on either side of the upper portions 48A and 50A.

Figure 7:
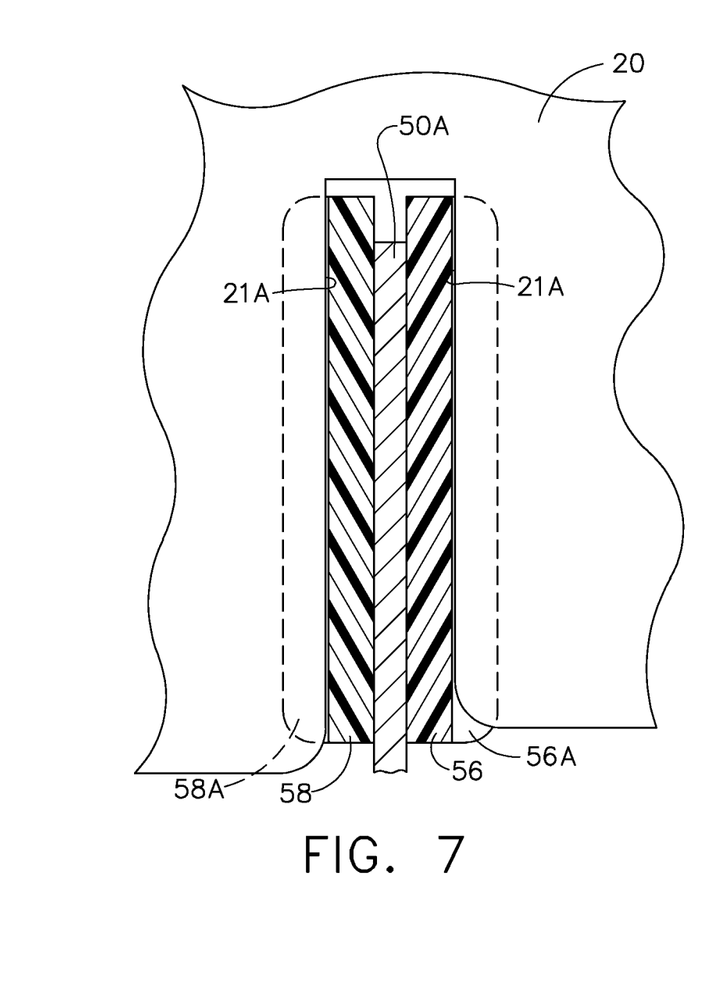
FIG. 7 is an enlarged fragmentary cross-sectional view taken through a groove/slot interface.

Referring to stop 20 as an example, slot 21A is received by the outward facing and parallel aligned pair of grooves 56A, 58A which sandwich upper portion 50A, and slot 21B is received by the outward facing and parallel aligned pair of grooves 52A,54A which sandwich upper portion 48A. This configuration aligns the grooves 52A, 54A, 56A, 58A with the rollers 14 to allows stops 16, 18, 20 to be slid into a pair of grooves 52A, 54A, 56A, 58A that aligns with a desired inter roller gap. This can be accomplished by aligning the stop with the desired roller gap and sliding the stop downward between the rollers 14. Since the gaps between the rollers 14 are aligned with the grooves 52A, 54A, 56A, 58A and the holes 45, the slots of the inserted stop 16, 18, or 20 will be guided into respective grooves. Referring to FIG. 7, this interface is illustrated. Groove 58A of guide 58A aligns laterally with groove 56A of guide 56. Slot 21A spans the distance between the respective bottoms of grooves 56A and 58A. Any suitable clearance may be used, so long as binding is avoided for the extension and retraction of stop 20.

Figure 8:
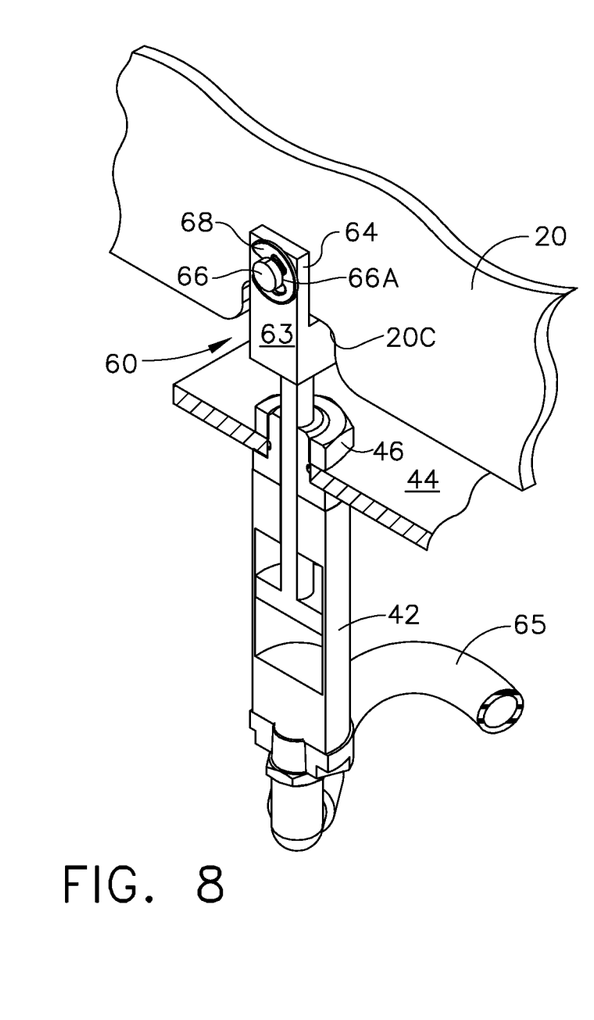
FIG. 8 is an enlarged fragmentary perspective view m partial cross-section showing the quick disconnect between a stop and an actuator.

Referring to FIG. 8, actuator 42, depicted as a spring loaded single acting pneumatic cylinders, includes a quick disconnect 60 that secures each actuator 38, 40, 42 to a respective stop 16, 18, or 20. Any suitable quick disconnect may be used, and in the embodiment depicted quick disconnect 60 includes bracket 63 which is received by recess 20C of stop 20. Bracket 63 includes upwardly pending arm 64 which receives, through a hole (not seen), retaining element 66, illustrated as a pin. Retaining pin includes groove 66A which receives C-clip 68 which may be snapped into and out of engagement with groove 66A so as to retain stop 20 to actuator 42. A flexible actuator line 65 can be attached to actuator 42 with a line connector 66. When disconnected, line connector 65 prevents actuation of an actuator. Actuator line 65 can conduct a fluid such as air to actuate the actuator 42. Should the actuator be magnetic, the actuator line 65 can conduct electricity for actuation thereof. Actuator line 65 is flexible and can be of sufficient length so that any one of the actuators such as actuator 42 can be moved to any one of a number of the holes 45 in central web 44 without requiring disconnection of the actuator line 65. This simplifies and speeds up reconfiguration of the stops 16, 18, and 20.

Positioning or repositioning any stop, such as stop 20, to another location is simple and efficient. Quick disconnect 60 quickly disconnects actuator 42 from stop 20, and stop 20 is withdrawn from the top through the inter roller space with which it is aligned. Actuator 42 is disconnected from central web 44, such as by undoing nut 46, and withdrawn downwardly through the hole. In the embodiment depicted, central web 44 includes a plurality of spaced apart openings 47 disposed to facilitate access to the disconnect features, including quick disconnect 60 and nut 46. Repositioning stop 20 to another location or position is the reverse procedure. If the actuators are pneumatic, the respective tube lengths may be long enough to accommodate all locations, or can be replaced as needed based on the position.

The foregoing description has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the preferred embodiment, specific terminology was used for the sake of clarity. It is to be understood that each specific term includes all technical equivalents which operate in a similar manner to accomplish a similar purpose. It is intended that the scope of the invention be defined by the claims submitted herewith.

The invention claimed is:

1. A conveyor comprising:
   two spaced apart frame members;
   a plurality of rollers supported by said two spaced apart frame members, said rollers defining an upper conveying surface;
   a plurality of gaps defined between said rollers;
   a support disposed under said plurality of rollers, said support comprising a plurality of spaced apart actuator mounting locations, each aligned with a respective gap;
   at least one actuator carried by said support at a respective actuator mounting location, said support and at least one actuator being configured to permit access to said at least one actuator from under said upper conveying surface in order to install or remove said at least one actuator from below said upper conveying surface;
   a respective stop connected to each respective actuator of said at least one actuator such that actuation of said respective actuator moves said respective stop between a first position at which at least a portion of said respective stop extends above said upper conveying surface and a second position at which said respective stop does not extend above said upper conveying surface, said respective stop being insertable through the respective aligned gap from above said upper conveying surface in order to install or remove said respective stop, and
   at least one respective guide associated with each actuator mounting location, said at least one respective guide configured to cooperate with said respective stop to guide said respective stop as it moves between said first and second positions, said at least one respective guide comprising at least one groove and at least a portion of said stop is disposed in said at least one groove as said stop moves between said first and second positions.

2. The conveyor of claim 1, wherein said stop comprises a respective slot shaped complementarily to and configured to engage said at least one groove as said stop is installed from above said upper conveying surface and to engage said at least one groove as said stop moves between said first and second positions.

3. The conveyor of claim 1 wherein said at least one actuator is connected to said respective stop by a quick disconnect.

4. The conveyor of claim 1 comprising means for quickly connecting said stop to said at least one actuator and for quickly disconnecting said stop from said at least one actuator.

5. The conveyor of claim 1 wherein said at least one actuator comprises a fluidic actuator which is connected to a source of fluid through a flexible line.

6. A conveyor configurable in at least first stop configuration and a second stop configuration, said conveyor comprising:
- two spaced apart frame members;
- a plurality of rollers supported by said two spaced apart frame members, said rollers defining an upper conveying surface;
- a plurality of gaps defined between said rollers;
- a support disposed under said plurality of rollers, said support comprising a plurality of spaced apart actuator mounting locations, each aligned with a respective gap;
- when said conveyor is configured in said first stop configuration, said conveyor comprising:
- at least one actuator being disposed at a first respective one of said plurality of actuator mounting locations;
- a respective connection between each said at least one actuator and said support at said first respective one of said plurality of actuator mounting locations;
- a respective stop associated with each said at least one actuator;
- a respective connection between said stop and its associated actuator, actuation of said at least one actuator moving said stop between a first position at which at least a portion of said stop extends above said upper conveying surface and a second position at which said stop does not extend above said upper conveying surface;
- when said conveyor is configured in said second stop configuration, said conveyor comprising:
- said at least one actuator being disposed at a second respective one of said plurality of actuator mounting locations;
- a respective connection between each said at least one actuator and said support at said second respective one of said plurality of actuator mounting locations.

7. The conveyor of claim 6 comprising at least one respective guide associated with each actuator mounting location, said at least one respective guide configured to cooperate with said respective stop to guide said respective stop as it moves between said first and second positions.

8. The conveyor of claim 7, wherein said at least one respective guide comprises at least one groove and at least a portion of said stop is disposed in said at least one groove as said stop moves between said first and second positions.

9. The conveyor of claim 8, wherein said at least one respective guide comprises two spaced apart pairs of guides, and each said respective stop comprises a respective slot shaped complementarily to and configured to engage each said groove as said stop is installed from above said upper conveying surface and to engage said at least one groove as said stop moves between said first and second positions.

10. The conveyor of claim 6, wherein said respective connection between said stop and its associated actuator is configured to be quickly disconnected and quickly reconnected.

11. The conveyor of claim 6, wherein said respective connection between each said at least one actuator and said support at said first respective one of said plurality of actuator mounting locations and said respective connection between each said at least one actuator and said support at said second respective one of said plurality of actuator mounting locations are identical.

12. The conveyor of claim 11, wherein said respective connection between each said at least one actuator and said support at said first respective one of said plurality of actuator mounting locations and said respective connection between each said at least one actuator and said support at said second respective one of said plurality of actuator mounting locations are configured to be quickly disconnected and quickly reconnected.

13. A apparatus for mounting moveable stops on a conveyor, said conveyor having two spaced apart frame member supporting a plurality of rollers with a plurality of gaps defined between the rollers, said plurality of rollers defining a conveying surface, said apparatus comprising:
- a stop subassembly supported by said two spaced apart frame members, said subassembly comprising first and second spaced apart frames, each said frame comprising a respective upper portion;
- a first and second pair of elongated guides, each guide of said first pair being disposed on opposite sides of said first frame, each guide of said second pair being disposed on opposite sides of said second frame, each of said guide comprising outwardly opening spaced apart aligned groves disposed along the length of said guide, each respective groove of one guide being aligned with and forming a groove pair with a respective groove of the other guide of said pair;
- at least one stop comprising a pair of spaced apart slots complementarily shaped and located so as to be received by a respective groove pair of said first guide pair and a respective groove pair of said second guide pair; and
- a respective actuator associated with each said at least one stop, said actuator having a quick disconnect connected to said at least one stop.

* * * * *